(12) United States Patent
Dong et al.

(10) Patent No.: US 8,406,236 B2
(45) Date of Patent: *Mar. 26, 2013

(54) METHOD AND APPARATUS FOR TRANSPORTING CLIENT SIGNAL IN OPTICAL TRANSPORT NETWORK

(75) Inventors: Limin Dong, Shenzhen (CN); Qiuyou Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

This patent is subject to a terminal disclaimer.

(21) Appl. No.: 13/109,537

(22) Filed: May 17, 2011

(65) Prior Publication Data

US 2011/0217047 A1     Sep. 8, 2011

Related U.S. Application Data

(63) Continuation of application No. 12/496,039, filed on Jul. 1, 2009, now Pat. No. 7,978,712, which is a continuation of application No. PCT/CN2008/071331, filed on Jun. 16, 2008.

(30) Foreign Application Priority Data

Jun. 15, 2007  (CN) .......................... 2007 1 0127016

(51) Int. Cl.
    *H04L 12/28*     (2006.01)
(52) U.S. Cl. .................................... 370/395.5; 370/503
(58) Field of Classification Search ........................ None
    See application file for complete search history.

(56) References Cited

U.S. PATENT DOCUMENTS

| 7,028,241 | B1 | 4/2006 | Blair et al. |
| 7,260,099 | B1* | 8/2007 | Brown et al. ............ 370/395.51 |
| 2003/0048813 | A1 | 3/2003 | Lahav et al. |
| 2003/0123493 | A1 | 7/2003 | Takahashi |
| 2005/0117585 | A1* | 6/2005 | Linkewitsch et al. ...... 370/395.5 |
| 2007/0116061 | A1* | 5/2007 | Meagher et al. .............. 370/503 |

FOREIGN PATENT DOCUMENTS

| CN | 1770673 A | 5/2006 |
| CN | 1879370 A | 12/2006 |
| CN | 1901536 A | 1/2007 |
| CN | 101325465 B | 6/2007 |
| CN | 101155006 A | 4/2008 |
| EP | 1770886 A1 | 4/2007 |

OTHER PUBLICATIONS

ITU-T, "Series G: Transmission Systems and Media, Digital Systems and Networks, Digital terminal equipment—General, Series Y: Global Information Infrastructure, Internet Protocol Aspects and Next-Generation Networks, Internet Protocol Aspects—Transport", Interfaces for the Optical Transport Network (OTN), Corrigendum 1, G.709/Y.1331 Corrigendum 1, pp. i-iii and 1-6, (Dec. 2006).

(Continued)

*Primary Examiner* — David Oveissi

(57) ABSTRACT

A method for transporting a client signal in an optical transport network (OTN) includes steps as follows. A byte number Cn of a client signal transported in a OTN frame period is generated according to a client signal clock and a system clock. If the Cn of the OTN frame falls in a certain range, a predetermined area in an optical channel payload unit-k (OPUk) overhead field is identified as normal, and the Cn is filled in the OPUk overhead field of the OTN frame. Therefore, the reliability for transporting the client byte number can be improved and an OPUk overhead byte space needed for transporting the client signal byte number can be saved.

15 Claims, 6 Drawing Sheets

| Cbyte | New client signal indication identifier | Cn value or Cn value increasing or decreasing indication |

OTHER PUBLICATIONS

ITU-T, "Series G: Transmission Systems and Media, Digital Systems and Networks, Digital terminal equipments—General, Series Y: Global Information Infrastructure, Internet Protocol Aspects and Next Generation Networks, Internet Protocol Aspects—Transport", Interfaces for the Optical Transport Network (OTN), G.709/Y.1331, pp. i-iv and 1-111, (Mar. 2003).

Written Opinion of the International Search Authority (translation) dated (mailed) Oct. 9, 2008, issued in related Application No. PCT/CN2008/071331, filed Jun. 16, 2008, Huawei Technologies Co., Ltd.

Supplementary European Search Report dated (mailed) Jan. 19, 2010, issued in related Application No. EP 08757742, filed Jun. 16, 2008; Huawei Technologies Co., Ltd.

"Interfaces for the Optical Transport Network (OTN); G.709/Y.1331 (Mar. 2003)" ITU-T Standard in Force (I), International Telecommunication Union, Geneva, CH, No. G.709/Y.1331, Mar. 16, 2003, XP017400848 chapter 17.1.

"G.709 Living List" OTN G.709 ITU-T Study Group 15 Living List Study Points, International Telecommunication Union, Geneva, CH, Mar. 1, 2007.

Chinese Office Action dated Jul. 10, 2009, in related Chinese Application No. 2007101270169 with English translation.

Extended European Search Report dated (mailed) Jan. 20, 2012, issued in related Application No. EP 11180134.6-2415, Hauwei Technologies Co., Ltd.

ITU-T, International Telecommunication Union, ITU-T G.709/Y.1331, Series G: Transmission Systems and Media, Digital Systems and Networks, Digital terminal equipments—General, Series Y: Global Information Infrastructure, Internet Protocol Aspects and Next Generation Networks, Internet Protocol Aspects—Transport, Interfaces for Optical Transport Network (OTN), Mar. 2003.

Written Opinion of the International Searching Authority (translation) dated (mailed) Oct. 9, 2008, issued in related Application No. PCT/CN2008/071331, filed Jun. 16, 2008, Huawei Technologies Co., Ltd.

Supplementary European Search Report dated (mailed) Jan. 19, 2010, issued in related Application No. EP 08757742, filed Jun. 16, 2008, Hauwei Technologies Co., Ltd.

"G.709 Living List" OTN G.709 ITU-T Study Group 15 Living List Study Points, , International Telecommunication Union, Geneva, CH, Mar. 1, 2007.

International Search Report from P.R. China in International Application No. PCT/CN2008/071331 mailed Oct. 9, 2008.

"Interfaces for the Optical Transport Network (OTN); Corrigendum 1, G.709/Y.1331 Corrigendum (Dec. 2006)" ITU-T Recommendation G.709/Y.1331 (2003); Corrigendum 1, International Telecommunication Union (ITU), Telecommunication Standardization Sector of ITU, (10 pages).

* cited by examiner

US 8,406,236 B2

METHOD AND APPARATUS FOR TRANSPORTING CLIENT SIGNAL IN OPTICAL TRANSPORT NETWORK

CROSS-REFERENCE TO RELATED APPLICATIONS

This application is a continuation of U.S. patent application Ser. No. 12/496,039, filed on Jul. 1, 2009 now U.S. Pat. No. 7,978,712, which is a continuation of International Application No. PCT/CN2008/071331, filed on Jun. 16, 2008. The International Application claims priority to Chinese Patent Application No. 200710127016.9, filed on Jun. 15, 2007. The afore-mentioned patent applications are hereby incorporated by reference in their entireties.

FIELD OF THE DISCLOSURE

The present disclosure relates to an optical communication technology, and more particularly to a method and an apparatus for transporting a client signal in an optical transport network (OTN).

BACKGROUND OF THE DISCLOSURE

With the rapid development of social economy, people's demand on information is increasing dramatically. Thanks to a huge potential bandwidth capacity of the optical fiber of approximately 30 THz, the optical fiber communication has become one of the most important technologies that support the increment of the communication traffic.

In the OTN, the technology of mapping and enveloping a client signal for being transported in the OTN is called a digital enveloping technology, which includes, for example, a mapping/multiplexing structure of an optical channel transport unit (OTU), and time division multiplexing and client signal mapping technical means of an optical channel data unit-k (ODUk).

In order to transmit a client signal, first, the client signal is mapped to an optical channel payload unit-j (OPUj), in which j represents a supported bit rate, which may be 1, 2, and 3 respectively representing the rate levels of approximately 2.5 Gbit/S, 10 Gbit/S, and 40 Gbit/S, then an overhead of the OPUj is added, so as to form the OPUj. Next, a channel overhead of an optical channel data unit-j (ODUj) is added to the OPUj, so as to form the ODUj. Then, an OTU overhead and a forward error correction (FEC) overhead are added to the ODUj, so as to form an optical channel transport unit-j (OTUj). Then, the OTUj is loaded to a certain wavelength and transmitted.

When the client signal is mapped to the OPUj, in order to transport different types of client signals, a plurality of service mapping methods is provided in the OTN specification, including a constant bit rate (CBR) signal mapping method, a generic framing procedure (GFP) frame mapping method, and an asynchronous transfer mode (ATM) cell flow mapping method. As the data services are continuously increasing, new demands are proposed on the full rate transparent transport capability of the OTN, so that the CBR mapping manner is applied more and more widely.

In the prior art, a CBR mapping method is provided, and an optical channel payload unit-k (OPUk) frame structure adopted in the method is as shown in FIG. 1. In such a frame structure, a Cbyte indicates a client signal byte number mapped within one OTN frame period, so that a payload area of the OPUk with a byte space of 3808×4=15232 bytes requires totally a length of 14 bits for indication, that is, the Cbyte occupies 2 bytes. The correctness of the Cbyte value directly influences a reliability for transporting the client signals, so that in the prior art, three same Cbyte values are transported in each frame, and errors are filtered by adopting a majority vote manner, thereby improving the reliability for transporting the client signals.

When the client signals are mapped to OTN virtually concatenated OPUk-Xv (X virtually-concatenated OPUks) by adopting the prior art CBR mapping method, virtual concatenation overhead (VCOH) and payload structure identifier (PSI) occupy a space of 4 bytes in each OPUk overhead of OPUk-Xv, so that only 4 bytes in the $16^{th}$ column are left for the Cbyte. Thus the demands on the space indication and majority vote cannot be satisfied, and the Cbyte only occupying 2 bytes cannot indicate a byte space under a situation of over 5 virtually-concatenated OPUks.

In order to solve the above problems, the following methods are adopted in the prior art.

Firstly, under a situation of OPUk-2v (2 virtually-concatenated OPUks), every 2 bytes in the residual bytes of the OPUk-2v channel overhead are distributed to one Cbyte, and the errors are filtered by adopting the majority vote manner. Furthermore, a byte space of 3808×4×2 for the OPUk-2v can be completely indicated. One of the possible distribution solutions is as shown in the OPUk-2v frame structure shown in FIG. 2.

Next, under a situation of OPUk-Xv (X≧3) (more than 3 virtually-concatenated OPUks), 3 bytes are distributed to one Cbyte, and the Cbyte occupying 3 bytes can indicate a maximum byte space of 3808×4×256 for the OPUk-Xv (that is, at most X=256 virtually-concatenated OPUk frames can be supported). Furthermore, at least 3 virtually-concatenated OPUk frames exist, so that 3 Cbyte spaces are distributed in the OPUk-Xv OH for performing the majority vote. The detailed frame structure may be obtained with reference to an OPUk-3v frame structure shown in FIG. 3.

During the research and practicing process in the prior art, it was found that the following problems exist in the prior art.

First, as the byte number of the byte space of the Cbyte is increasing, if an error occurs to any one bit among 16 bits when being transported, the whole Cbyte value becomes incorrect. By simply transporting 3 same Cbytes in each frame and adopting the majority vote manner, the reliability and the error tolerance are not desirable. Furthermore, 3 same Cbytes are transported in each frame, so that excessive overhead bytes are occupied, which is not helpful for further standardized expansion.

Next, no prior art CBR mapping frame structure with a uniform format is provided for the OPUk-Xv, which is a disadvantage for achieving the uniformity of the CBR mapping frame structure. In the above prior art CBR mapping method, the client signal byte number Cn transported in the OTN frame period has become an important factor that influences the reliability.

SUMMARY OF THE DISCLOSURE

Accordingly, the present disclosure is directed to a method for transmitting and receiving a client signal in an OTN, which is capable of improving the reliability for transporting a client signal byte number.

In one embodiment, the present disclosure provides a method for transmitting a client signal in an OTN, which includes the following steps.

A client signal is acquired, and a client signal clock is extracted from the client signal.

A client signal byte number Cn transported in an OTN frame period is generated according to the client signal clock and a system clock.

It is determined whether the client signal byte number Cn exceeds a range of the byte number of the client signal transported in the OTN frame period or not.

If the Cn of the OTN frame falls in the range, a predetermined area in an OPUk overhead field of the OTN frame is identified as normal, and the Cn is filled in the OPUk overhead field. Meanwhile, Cn client signal bytes are mapped to an OPUk payload area of a next OTN frame, and an OTU including the OPUk is transmitted to the OTN network.

In another embodiment, the present disclosure provides a method for receiving a client signal in an OTN, which includes the following steps.

An OPUk of an OTN frame is parsed, so as to acquire a first area and a second area predetermined in an OPUk overhead field.

An identifier in the first area and a client signal byte number Cn filled in the second area are acquired.

If the identifier indicates that the Cn does not exceed a range of client signal byte number of the acquired client signal transported in one OTN frame period, a comparison is performed to determine whether the Cn filled in the second area exceeds a range of client signal byte number of the acquired client signal transported in one OTN frame period or not, and if not, the Cn filled in the second area is stored.

Data of an OPUk payload area of a next OTN frame is restored according to the stored client signal byte number Cn, so as to acquire a client signal data stream.

In another embodiment, the present disclosure provides an apparatus for transmitting a client signal in an OTN, which includes a receiving unit, a client signal byte number Cn generating unit, a determining unit, a setting unit, a mapping unit, and a transmitting unit.

The receiving unit is configured to acquire a client signal, and extract a client signal clock from the client signal.

The client signal byte number Cn generating unit is configured to generate a client signal byte number Cn transported in an OTN frame period according to the client signal clock and a system clock.

The determining unit is configured to determine whether the client signal byte number Cn exceeds a range of client signal byte number transported in an OTN frame period or not.

The setting unit is configured to set and/or fill an area of an OPUk of the OTN frame.

The mapping unit is configured to map client signal bytes to an OPUk payload area.

The transmitting unit is configured to transmit an OTU.

If the determining unit determines that the Cn of the OTN frame falls in the range, the setting unit identifies a predetermined area in an OPUk overhead field of the OTN frame as normal and fills the Cn in the OPUk overhead field, the mapping unit maps Cn client signal bytes to the OPUk payload area of a next OTN frame, and the transmitting unit transmits an OTU including the OPUk to the OTN network.

In another embodiment, the present disclosure provides an apparatus for receiving a client signal in an OTN, which includes a receiving unit, a first parsing unit, a second parsing unit, a first determining unit, a storing unit, and a client signal recovering unit.

The receiving unit is configured to acquire an OPUk from the OTN.

The first parsing unit is configured to parse the OPUk to acquire an identifier in a first area of an OPUk overhead field of an OTN frame.

The second parsing unit is configured to parse the OPUk to acquire a client signal byte number Cn filled in a second area of the OPUk overhead field of the OTN frame.

The first determining unit is configured to compare whether the Cn acquired through parsing by the second parsing unit exceeds a range of client signal byte number of the acquired client signal transported in one OTN frame period or not, if the identifier indicates that the Cn does not exceed a range of client signal byte number of the acquired client signal transported in one OTN frame period; and if not, trigger the storing unit to store the Cn acquired through parsing by the second parsing unit.

The storing unit is configured to maintain the Cn, and store the Cn acquired through parsing by the second parsing unit, upon being triggered by the first determining unit.

The client signal recovering unit is configured to restore data of an OPUk payload area of a next OTN frame according to the client signal byte number maintained by the storing unit, so as to acquire a client signal data stream.

In another embodiment, the present disclosure further provides a computer readable storage medium, which includes a computer program, configured to enable one or more processors to execute the method for transmitting the client signal in the OTN.

In another embodiment, the present disclosure further provides another computer readable storage medium, which includes a computer program, configured to enable one or more processors to execute the method for receiving the client signal in the OTN.

In the technical solutions of the embodiments of the present disclosure, a client signal byte number change identifier is further added in the Cbyte field, which is configured to verify the client signal byte number filled in the Cbyte field, so as to enhance the reliability for transporting the client byte number, thereby improving the reliability for transporting the client signal. Compared with the majority vote manner adopted in the prior art, the technical solutions of the embodiments of the present disclosure do not need to retransmit a plurality of client signal byte numbers to perform the majority vote, so as to save an OPUk overhead byte space required for transporting the client signal byte number.

BRIEF DESCRIPTION OF THE DRAWINGS

The present disclosure will become better understood from the detailed description given herein below for illustration only, and thus is not limitative of the present disclosure, and wherein.

DETAILED DESCRIPTION OF THE EMBODIMENTS

In the embodiments of the present disclosure, according to the CBR mapping method described in International Telecommunications Union-Telecommunications Standardization Sector (ITU-T) Recommendation 6709 Livinglist SP13, new Cbyte generating and explaining rules and operation method thereof are defined, so that a byte space occupied by the Cbyte is compressed, a reliability for transporting the Cbyte byte is enhanced, and a uniform Cbyte overhead format definition is provided for an OPUk-Xv (X=2~256) container adopting the agnostic CBR mapping method.

Figure 4:
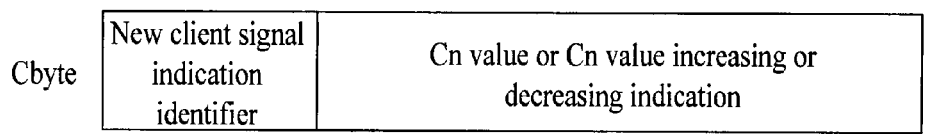
FIG. 4 is a schematic view of a Cbyte field according to an embodiment of the present disclosure.

FIG. 4 is a schematic view of a Cbyte field according to an embodiment of the present disclosure. Referring to FIG. 4, in the embodiments of the present disclosure, the Cbyte field is divided into two parts, that is, a first area and a second area, in which the first area is configured to indicate whether a new client signal occurs or not, and the second area is configured to fill a value of a client signal byte number Cn or is configured to indicate whether the Cn value generated by adopting the method provided hereafter is increased or decreased.

A size of the Cbyte field may be selected according to actual requirements. In order to satisfy the uniform indication of the OPUk and OPUk-Xv (supporting X=256 virtually-concatenated OPUks) payload spaces (with reference to the computation of the byte number required by the Cbyte), 3 bytes may be distributed to the Cbyte. If only a limited amount of virtually-concatenated OPUk-Xv needs to be supported, for example, X is 2 or 3, 2 bytes may be distributed to the Cbyte. The Cbyte occupying 3 bytes is set as an example for description as follows.

Figure 5:
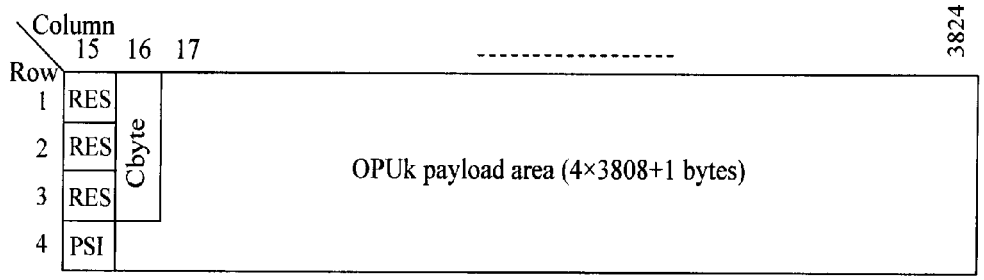
FIG. 5 is a schematic structural view of an OPUk frame with a Cbyte occupying 3 bytes according to an embodiment of the present disclosure.
Figure 6:
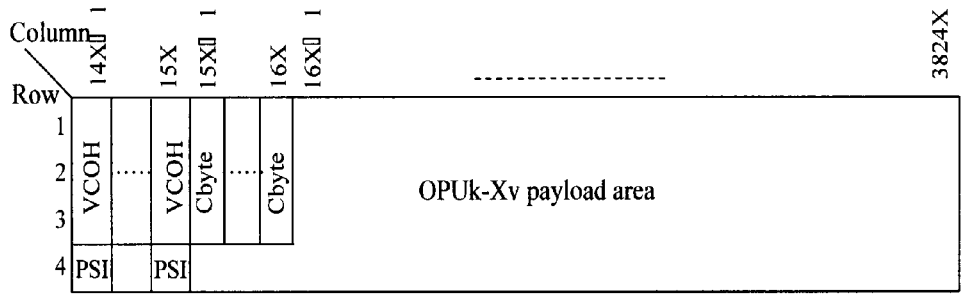
FIG. 6 is a schematic structural view of an OPUk-Xv frame with the Cbyte occupying 3 bytes according to an embodiment of the present disclosure.

Under a situation that the Cbyte is represented by 3 bytes, an OPUk frame structure is as shown in FIG. 5. An OPUk-Xv frame structure acquired by virtually concatenating X OPUks is as shown in FIG. 6. Here, the OPUk structure and the OPUk-Xv structure are unified.

Figure 1:
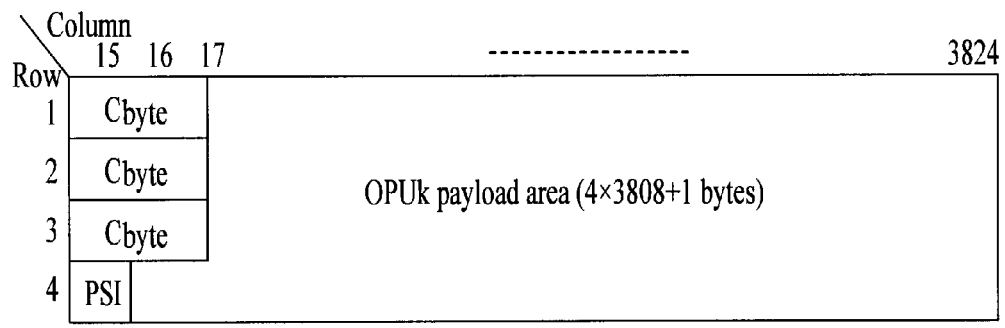
FIG. 1 is a schematic structural view of an OTN frame adopted in CBR mapping in the prior art.
Figure 2:
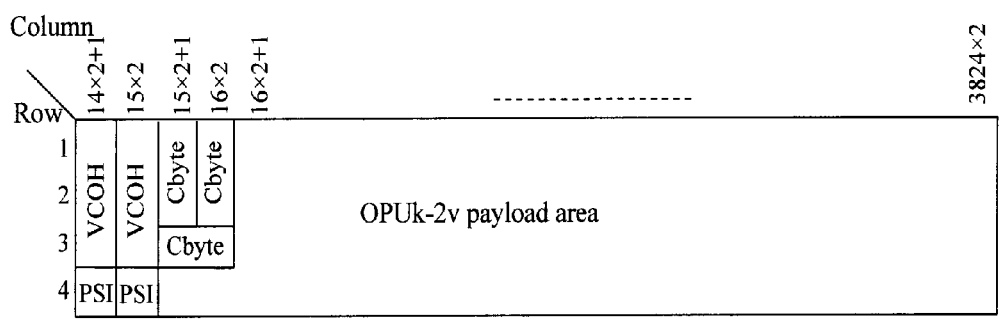
FIG. 2 is a schematic structural view of an OTN frame of OPUk-2v in the prior art.

Referring to FIG. 5, in the OPUk structure, the Cbyte occupies 3 bytes in the 16$^{th}$ column. As compared with the OPUk structure as shown in FIG. 1, the Cbyte in this embodiment occupies 3 bytes, thereby saving the overhead bytes of 3 OPUks.

Figure 3:
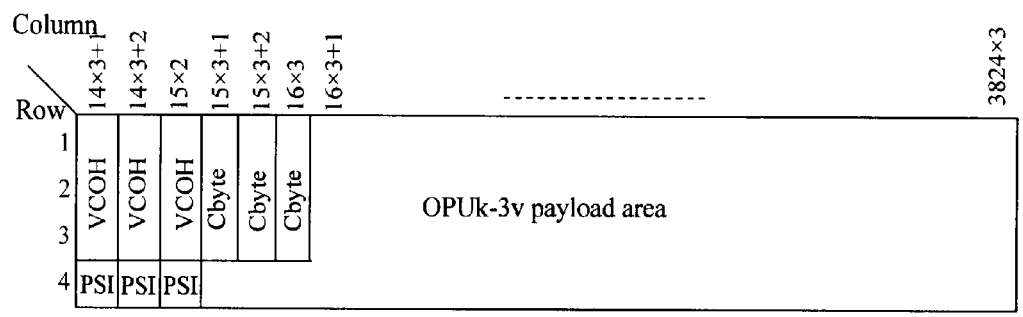
FIG. 3 is a schematic structural view of an OTN frame of OPUk-3v in the prior art.

Referring to FIG. 6, in the OPUk-Xv structure, X Cbyte field needs to be transported, and each Cbyte field occupies 3 bytes. As compared with the OPUk-3v as shown in FIG. 3, the number of Cbyte fields actually transported in this embodiment is the same as that of the prior art. However, in the embodiment of the present disclosure, the method capable of improving the reliability for transporting the client signal byte number Cn provided hereafter is adopted, instead of the majority vote manner adopted in the prior art. Therefore, theoretically, only one Cbyte field needs to be transported in the OPUk-Xv frame, and the other overhead bytes originally distributed to the Cbyte may be reserved or configured to perform the expansion of other contents.

As described above, in the embodiment of the present disclosure, the Cbyte occupying 3 bytes is set as an example, and according to the contents defined in FIG. 4, Table 1 shows a bit position distribution mode of the Cbyte occupying 3 bytes (that is, 24 bits).

TABLE 1

| Cbyte1 (row = 1) | | | | | | | | Cbyte2 (row = 2) | | | | | | | | Cbyte3 (row = 3) | | | | | | | |
|---|---|---|---|---|---|---|---|---|---|---|---|---|---|---|---|---|---|---|---|---|---|---|---|
| C | C | I | D | I | D | I | D | I | D | I | D | I | D | I | D | I | D | I | D | I | D | I | D |

As shown in Table 1, in this embodiment, 2 bit positions (C bit positions) are configured to identify the new client signal, that is, the first area of the Cbyte field, and the other 22 bit positions (I bit positions and D bit positions) are configured to fill the Cn value and indicate an increment or decrement of the Cn value, that is, the second area of the Cbyte field. The 22 bit positions can totally indicate 4194304 byte spaces, and the maximum byte space of the OPUk-Xv is (X=256) 3899392 bytes, so that all the situations of the byte spaces of the OPUk-Xv can be indicated by adopting 22 bit positions.

In addition, in order to enhance the reliability of identifying the new client signal, 3 bits, 4 bits, or more bit positions may be distributed to the first area to indicate the new client signal. Correspondingly, the spaces of the second area for filing the Cn value and indicating the increment or decrement of the Cn value are decreased. The Cbyte field generating rule according to the embodiments of the present disclosure is described in detail by taking the Cbyte field structure (that is, 2 bits are configured to identify the new client signal and 22 bits are configured to indicate the Cn value and the increment or decrement of the Cn value) as shown in Table 1 as an example.

Please refer to Table 1.

1) It is assumed that a CC identifying position is set as "01", which represents that the normal Cn values are filled in the last 22 bit positions of the Cbyte.

As for the determined OPUk and the determined client signal type, the Cn of a certain signal type born by the OPUk falls in a certain range, that is, for a certain client signal type, a Cn maximum value and a Cn minimum value exist for the signal type born by the OPUk.

The normal Cn value refers to a Cn value acquired according to a client signal clock and a system clock that falls in a range between the minimum value and the maximum value of the detected client signal Cn (including the minimum Cn minimum value and the Cn maximum value), which represents that the client signal type born by the current OPUk remains unchanged, and it is still the client signal type born by the previous OPUk.

If a new client signal is detected, that is, the client signal type of the current frame is changed as compared with the detected client signal type, that is, the Cn acquired according to the client signal clock and the system clock exceeds the range between the minimum value and the maximum value of the detected client signal Cn, so that the CC bit position is set as "10" for identification.

In the above embodiment, it is defined that the Cn value is identified as normal (that is, the client signal type remains unchanged) when the CC bit position is 01, and it is identified that a new client signal is monitored (that is, the client signal type is changed) when the CC bit position is 10. Thus, if the CC bit position is other values, such values are illegal values, which represent that the transport of the CC bit position may become abnormal. However, the value setting of the CC bit position under different identifying states is not limited in the present disclosure.

The client signal transported by adopting the OPUk is taken as an example, and the methods for computing the Cn maximum value and the Cn minimum value are listed as follows.

$$Cn \text{ Maximum Value} = int\left[\frac{\text{Client Signal Rate} + \text{Frequency Deviation}}{ODUk \text{ Payload Rate} - 20 \text{ ppm}} \times 3808 \times 4\right]$$

$$Cn \text{ Minumum Value} = int\left[\frac{\text{Client Signal Rate} - \text{Frequency Deviation}}{ODUk \text{ Payload Rate} + 20 \text{ ppm}} \times 3808 \times 4\right]$$

If X virtually-concatenated OPUks (OPUk-Xv) channels are adopted for transporting, the methods for computing the Cn maximum value and the Cn minimum value are listed as follows.

$$Cn \text{ Maximum Value} = int\left[\frac{\text{Client Signal Rate} + \text{Frequency Deviation}}{ODUk - Xv \text{ Payload Rate} - 20 \text{ ppm}} \times 3808 \times 4 \times X\right] + 1$$

$$Cn \text{ Minumum Value} = int\left[\frac{\text{Client Signal Rate} - \text{Frequency Deviation}}{ODUk - Xv \text{ Payload Rate} + 20 \text{ ppm}} \times 3808 \times 4 \times X\right]$$

In the above equations, 20 ppm is a jitter range of the system clock.

Particularly, it is assumed that, for example, an OPU4 (104.6641791 kbit/s, ±20 ppm) bears a client signal of 100GE (103.125 kbit/s, ±100 ppm).

According to the above methods for computing the Cn maximum value and the Cn minimum value, it may be acquired that:

$$Cn \text{ Maximum Value} = int\left[\frac{103.125 \times (1 + 0.0001)}{104.6641791 \times (1 - 0.0002)} \times 3808 \times 4\right] + 1$$
$$= 15010 \text{ bytes}$$

$$Cn \text{ Minumum Value} = int\left[\frac{103.125 \times (1 - 0.0001)}{104.6641791 \times (1 + 0.0002)} \times 3808 \times 4\right]$$
$$= 15006 \text{ bytes}$$

2) If it intends to increase the client signal byte number (Cn) transported in the OTN frame, among the Cbyte field as shown in Table 1, 11 I bit positions of the second area are reversed. In the embodiment of the present disclosure, the mode of reversing I bit positions represents that the Cn value in the next OTN frame will be increased.

After 11 I bit positions of the OTN frame are reversed, the Cn value filled in the second area of the Cbyte field of the next OTN frame is the Cn value of the OTN frame previous to the OTN frame increased by one unit value. In this embodiment, the unit value is 1. However, those skilled in the art may set the unit value according to the actual demands. In the following embodiments of the present disclosure, the unit value is 1.

If the Cn value of the previous OTN frame is the Cn maximum value, the Cn of the next OTN frame remains unchanged.

3) If it intends to decrease the client signal byte number (Cn) transported in the OTN frame, among the Cbyte field as shown in Table 1, 11 D bit positions of the second area are reversed. In the embodiment of the present disclosure, the mode of reversing D bit positions represents that the Cn value in the next OTN frame will be decreased.

After 11 D bit positions of the OTN frame are reversed, the Cn value filled in the second area of the Cbyte field of the next OTN frame is the Cn value of the OTN frame previous to the OTN frame decreased by one unit value. In this embodiment, the unit value is 1. However, those skilled in the art may set the unit value according to the actual demands. In the following embodiments of the present disclosure, the unit value is 1.

If the Cn value of the previous OTN frame is the Cn minimum value, the Cn of the next OTN frame remains unchanged.

4) If an abnormal alarm indicator (for example, loss of signal (LOS) and loss of frame (LOF)) of the client signal is received, all 0 or all 1 are filled in the first area and the second area of the Cbyte field, which represents that the Cbyte is in an alarm indication signal (AIS) state.

Figure 7:
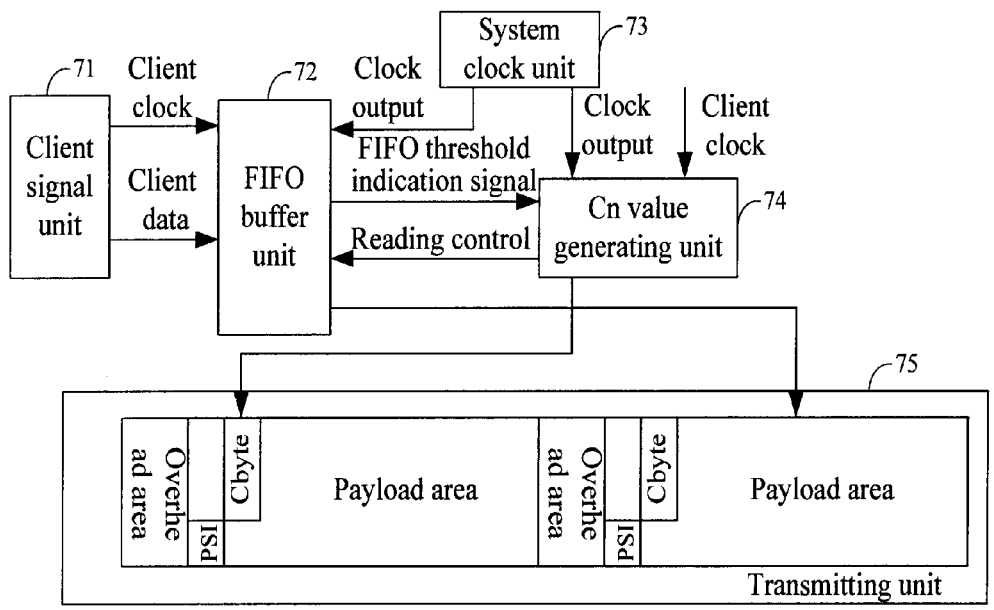
FIG. 7 is a schematic view of a data processing procedure of a client signal transmitting end according to an embodiment of the present disclosure.

Referring to FIG. 7, a method for generating a demand of increasing/decreasing the client signal byte number (Cn value) born by the OPUk is described below in detail. A client signal transmitting end includes a client signal unit 71, a system clock unit 73, and a first in first out (FIFO) buffer unit 72.

The client signal unit 71 is configured to write a client signal into the FIFO buffer unit according to a client signal clock rate.

The system clock unit 73 is configured to provide a system clock rate.

The FIFO buffer unit 72 is configured to accept a control of a reading control signal generated by a Cn generating unit in the OTN frame, and write the client signal in the buffer unit to an OPUk payload area of a next OTN frame according to the system clock rate.

Usually, a deviation exists between the writing according to the client signal clock and the reading according to the system clock, that is, the rate of writing the client signal into the buffer unit is higher or lower than the rate of reading the client signal from the buffer unit and writing the client signal to the OPUk payload area according to the system clock rate. Furthermore, when a system clock reading rate is relatively high, the client signal data buffered in the buffer unit reaches and is lower than a lower threshold of the buffer unit. When a client signal clock writing rate is relatively high, the client signal data buffered in the buffer unit reaches and exceeds an upper threshold of the buffer unit. In this case, if the client signal data buffered in the buffer unit reaches or exceeds the upper threshold of the buffer unit, the buffer unit transmits a first threshold indication signal to a Cn value generating unit 74, so as to generate the demand of increasing the client signal byte number Cn born by the OPUk. If the client signal data buffered in the buffer unit reaches or is lower than the lower threshold of the buffer unit, the buffer unit transmits a second threshold indication signal to the Cn value generating unit 74, so as to generate the demand of decreasing the client signal byte number Cn born by the OPUk.

The embodiment of the Cbyte field structure as shown in Table 1 is provided. In addition, the Cbyte field structure may be varied. For example, in the embodiment as shown in Table 1, in the second area of the Cbyte field, 22 bit positions are divided into two series of bit positions, that is, I bit positions and D bit positions respectively. The I bit positions and the D bit positions are alternately set, and all the 22 bit positions (that is, 11 I bit positions and 11 D bit positions) of the second area are evenly distributed. However, as for the first variation of the Cbyte field structure, the I bit positions and the D bit positions may not be alternately set, for example, in the second area, the first 11 bit positions are set as I bit positions, and the last 11 bit positions are set as D bit positions. As for the second variation of the Cbyte field structure, the I bit positions and the D bit positions are not evenly distributed to all the 22 bit positions of the second area, or not all the 22 bit positions are set as I bit positions or D bit positions. Those skilled in the art may configure the division and definition of the bit positions in the Cbyte field structure according to the actual demands, which is not limited in the present disclosure.

Figure 8:
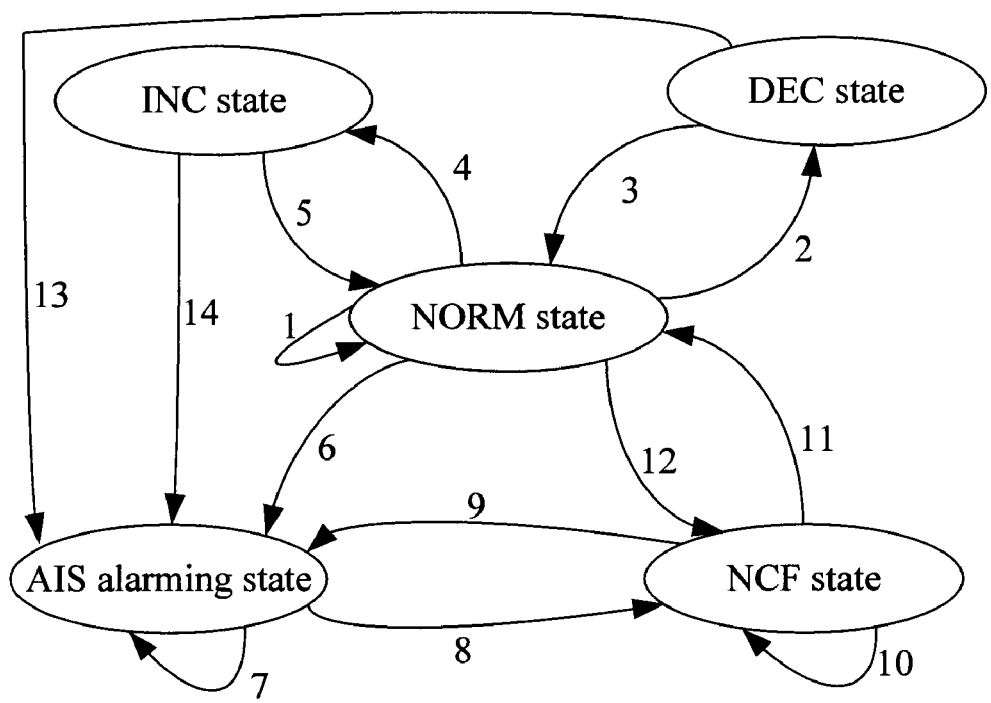
FIG. 8 is a schematic view of a state machine of the client signal transmitting end according to an embodiment of the present disclosure.

Referring to FIG. 8, according to the above Cbyte field generating rule, a Cbyte generating state machine at the transmitting end is described in detail as follows. The Cbyte generating state machine totally has five states, including a Cn increasing state (INC state), a Cn decreasing state (DEC state), a Cn normal state (NORM state), an AIS alarming state, and a new client signal state (NCF state).

In the INC state, the Cn value is increased by 1, in which the I bit positions are reversed.

In the DEC state, the Cn value is decreased by 1, in which the D bit positions are reversed.

In the NORM state, the Cn value is in a normal state, that is, CC=01, 22-bit Cn value is a normal value.

In the AIS alarming state, all 0 or all 1 are filled in the first area and the second area of the Cbyte field.

In the NCF state, the CC value of the first area of the Cbyte field is 10, which is identified as a new client signal, and meanwhile, a new client signal byte number Cn is filled in the second area of the Cbyte field.

Referring to FIG. 8, jump conditions among each state of the client signal transmitting end are described in detail.

In a jump condition 1, the client signal is normally received, the FIFO buffer does not have a Cn adjustment request, and no new client signal is detected.

In a jump condition 2, the rate for reading data from the FIFO buffer unit according to the system clock is higher than the rate for writing data into the FIFO buffer unit according to the client clock, so that the client signal data buffered in the FIFO buffer unit reaches or is lower than a lower threshold of the FIFO buffer unit, and thus the FIFO buffer unit generates an adjustment request of decreasing the Cn by 1.

In a jump condition 3, the client signal is normally received.

In a jump condition 4, the rate for reading the data from the FIFO buffer unit according to the system clock is lower than the rate for writing the data into the FIFO buffer unit according to the client clock, so that the client signal data buffered in the FIFO buffer unit reaches or exceeds an upper threshold of the FIFO buffer unit, and thus the FIFO buffer unit generates an adjustment request of increasing the Cn by 1.

In a jump condition 5, the client signal is normally received.

In a jump condition 6, an indication representing that the client signal is abnormal is received.

In a jump condition 7, the indication representing that the client signal is abnormal is received.

In a jump condition 8, a new client signal is detected.

In a jump condition 9, the indication representing that the client signal is abnormal is received.

In a jump condition 10, a new client signal is detected.

In a jump condition 11, the client signal is normally received.

In a jump condition 12, a new client signal is detected.

In a jump condition 13, the indication representing that the client signal is abnormal is received.

In a jump condition 14, the indication representing that the client signal is abnormal is received.

On the basis of the embodiment of the state machine of the client, a 3-frame filtering mode is further adopted in the present disclosure, thereby further improving the reliability for transporting the client signal byte number, so as to filter the errors possibly generated to the Cbyte during the transporting process, and prevent the Cn value from being frequently changed due to the jittering of the client signal clock or system clock. Particularly, when the demand of increasing/decreasing the Cn is generated, the state machine enters the INC state/DEC state. Accordingly, the I bit positions or the D bit positions are reversed in the Cbyte field of the current OPUk frame, so that the Cn value is adjusted to be increased/decreased by 1 in the next frame of the current OPUk frame, and the adjusted Cn value is newly adjusted once again after lasting for at least 3 frames, that is, the Cn value is newly adjusted once in at least a $5^{th}$ frame. According to the 3-frame filtering mode, those skilled in the art may set the frame number adopted during the filtering according to the actual requirements.

The OPU4 (104.6641791 kbit/s, ±20 ppm) bearing 100GE (103.125 kbit/s, ±100 ppm) is taken as an example below, and a tolerance of the FIFO buffer unit required after the 3-frame filtering mode is adopted in the embodiment of the present disclosure is described in detail as follows.

According to the above methods for computing the Cn maximum value and the Cn minimum value, it is acquired that:

Cn maximum value=15010 bytes, and Cn minimum value=15006 bytes.

In consideration of the extreme situations, when the Cn is increased from the Cn minimum value (15006 bytes) to the Cn maximum value (15010 bytes), the operation of increasing the Cn by 1 is required to be performed for a total of 4 times. Since the 3-frame filtering mode is adopted, 4 frames (the I bits of the first frame are reversed, and the Cns of the next three frames are increased by 1 and then maintained unchanged) are required each time when the operation of increasing the Cn by 1 is performed. Thus, when the Cn is increased from 15006 bytes to 15010 bytes, a total of 16 frames is required. The difference of the maximum Cn byte number for each frame caused by the frequency deviation of the client signal clock, the frequency deviation of the system clock, and the frequency deviation of the Cn-rounding clock is 15010−15006=4 bytes. Thus, as for the 16 frames, a storage tolerance requirement on the FIFO buffer unit is 64 bytes at the maximum level. However, practically, the accumulation of the clock frequency deviation of 3 bytes is absorbed at each operation of increasing the Cn by 1, so that the byte number maximally accumulated or decreased by the FIFO buffer unit should be smaller than 64, and upper overflow and lower overflow tolerances of the FIFO buffer unit required in the method are not too much.

On the basis of the embodiment of the method for generating the Cbyte field at the client signal transmitting end, the present disclosure further provides a method for transmitting a client signal in an OTN, which includes the following steps.

In Step A1, an input client signal is acquired, a client clock is recovered from the client signal by adopting, for example, a phase locked loop, and the input client signal is stored in the FIFO buffer unit.

In Step A2, the client signal byte number Cn is acquired according to the client signal clock and a system clock. It is determined whether the Cn value is a normal Cn value or not, that is, it is detected whether a new client signal type occurs or not. According to the above determining method, particularly, it is determined whether the acquired Cn exceeds the range between the Cn minimum value and the Cn maximum value of the detected client signal or not.

In Step A3, it is identified whether a new client signal occurs or not in the CC bit position of the first area of the Cbyte filed of the OPUk.

If a new client signal is detected, the acquired client signal byte number Cn value is filled in the second area.

If no new client signal is detected, the client signal byte number Cn value is generated according to the Cbyte generating state machine at the transmitting end, and then the Cn value is filled in the second area.

Particularly, if the demand of increasing the byte number born by the OTN frame is generated, the values of the first series of bit positions (the I bit positions as shown in Table 1) in the second area of the OTN frame are reversed, and the client signal byte number filled before the values of the bit positions in the second area are reversed is increased by 1 in the next OTN frame.

If the demand of decreasing the byte number born by the OTN frame is generated, the values of the second series of bit positions (the D bit positions as shown in Table 1) in the second area of the OTN frame are reversed, and the client signal byte number filled before the values of the bit positions in the second area are reversed is decreased by 1 in the next OTN frame.

If an indication representing that the client signal is abnormal is acquired, all 1 or all 0 are filled in the Cbyte field of the OPUk.

Generally, if no demand of increasing/decreasing the byte number born by the OTN frame is generated, and no indication representing that the client signal is abnormal is received, the Cn value filled in the second area of the previous OTN frame is filled in the second area.

In Step A4, according to the client signal byte number Cn filled in the second area of the Cbyte field in the previous OTN frame, the reading control signal is output to the FIFO buffer unit to control the reading of the client signal. The client signal having Cn bytes is mapped to the OPUk payload area in the OTN frame through a $\Sigma$-$\Delta$ algorithm defined in 6709 Livinglist SP13. Then, the OPUk is transmitted to the OTN network.

In the above embodiment, if x OPUks are virtually concatenated to acquire an OPUk-Xv, in which X is not smaller than 2, and the OTN frame is particularly an OPUk-Xv (X virtually-concatenated OPUks) period frame.

Those of ordinary skill in the art should understand that, all or a part of the steps in the method of the embodiment may be realized by relevant hardware instructed by a program, and the program may be stored in a computer readable storage medium. When the program is executed, the following steps are performed. The range of the client signal byte number Cn of the acquired client signal transported in one OTN frame period is saved. The client signal is acquired. The Cn transported in the OTN frame period is computed according to the client signal clock and the system clock. It is identified whether the Cn exceeds the range of the Cn or not in the first area of the Cbyte field of the OPUk. In the OTN frame, if the computed Cn exceeds the range of the Cn, the computed Cn is filled in the second area of the Cbyte field of the OPUk. If the computed Cn falls in the range of the Cn, the Cn filled in the previous OTN frame is filled in the second area of the OPUk of the OTN frame. In the frame next to the OTN frame, the Cn client signal bytes are mapped to the OPUk payload area, and the OPUk is transmitted to the OTN network. The storage medium may be a read only memory, a magnetic disk, or an optical disk.

In the above descriptions, the processing operations executed by the client signal transmitting end during the process of transmitting the client signal have been described with reference to a plurality of embodiments, and the processing operations executed by the client signal receiving end are further described as follows.

Firstly, according to the Cbyte field generating rule adopted by the client signal transmitting end, a Cbyte field parsing rule adopted by the client signal receiving end is further described (the structure as shown in Table 1 is set as an example).

1) Under the normal situation, the CC=01 in the first area of the Cbyte field is detected, which indicates that the normal Cn value is filled in the second area of the Cbyte field, and the normal Cn values are filled in the last 22 bit positions of the Cbyte.

If it is detected that CC=10, which indicates that a new client signal occurs, the received Cn value is correspondingly changed, unless the Cn does not fall in the normal range.

2) If it is detected that most of the 11 I bits of the Cbyte are reversed, it indicates that the Cn of the next frame is increased by 1.

3) If it is detected that most of the 11 D bits of the Cbyte are reversed, it indicates that the Cn of the next frame is decreased by 1.

4) If it is detected that all 0 or all 1 is filled in the first area and the second area of the Cbyte field, it represents an AIS alarm.

Figure 9:
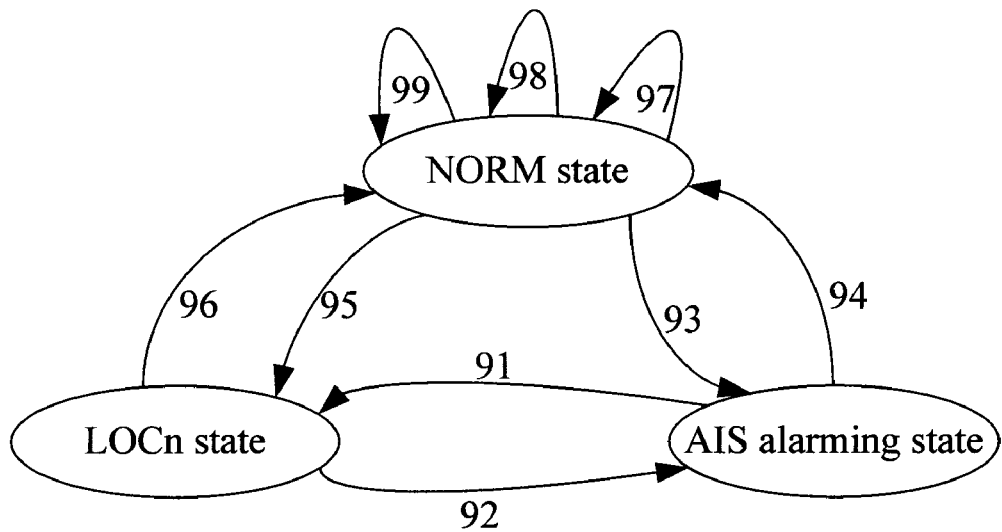
FIG. 9 is a schematic view of a state machine of a client signal receiving end according to an embodiment of the present disclosure.
Figure 10:
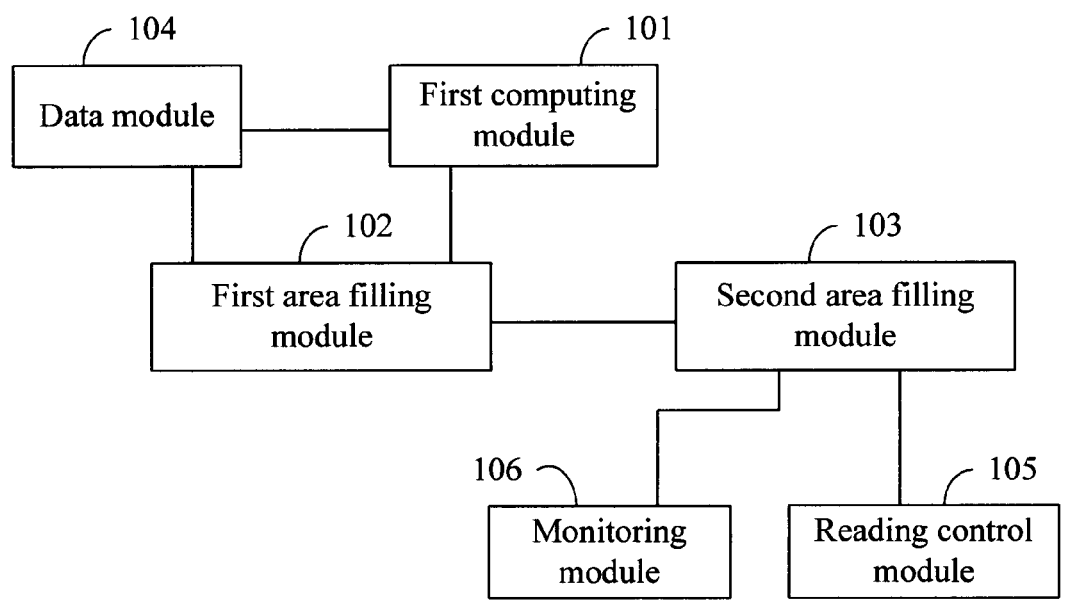
FIG. 10 is a schematic structural view of a Cn generating unit according to an embodiment of the present disclosure.
Figure 11:
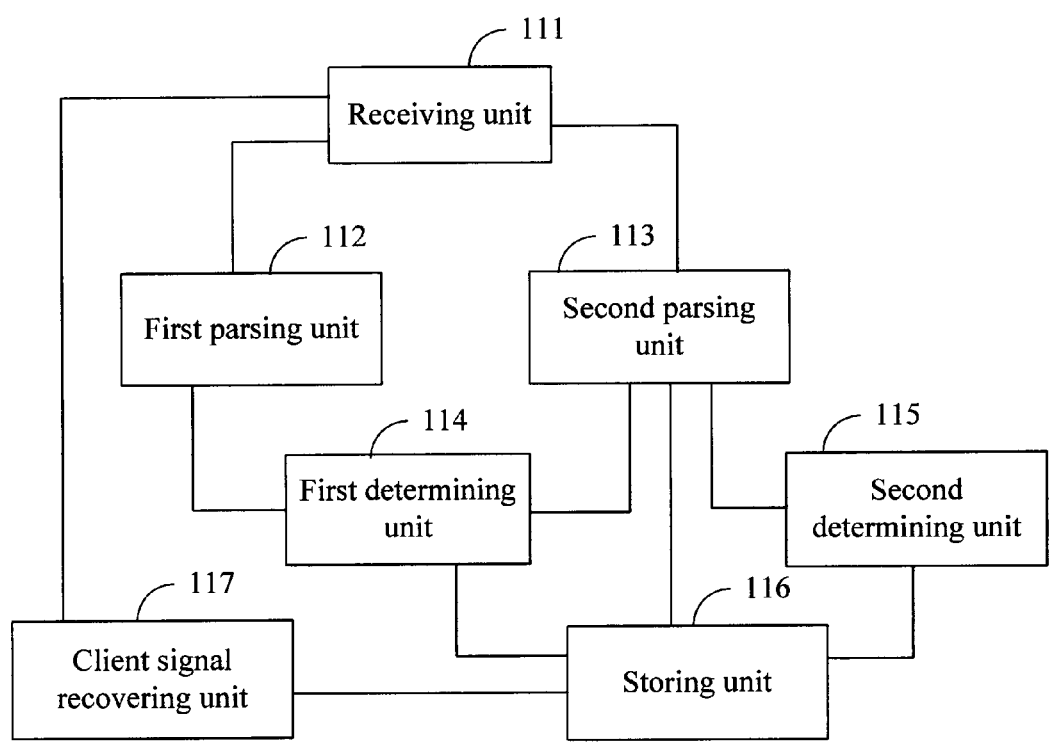
FIG. 11 is a schematic structural view of the client signal receiving end according to an embodiment of the present disclosure.

Referring to FIG. 9, according to the Cbyte field parsing rule, a Cbyte parsing state machine at the client signal receiving end is described in detail. The Cbyte parsing state machine has totally 3 states, including a Cn normal state (NORM state), an AIS alarming state, and a Cn loss state (LOCn state).

In the NORM state, the client signal receiving end stores the Cn value acquired through parsing, which is configured to recover the client signal data from the OPUk payload unit of the next OTN frame.

In the AIS alarming state, a preset alarming process is executed.

In the LOCn state, the latestly received normal Cn value is stored, so as to recover the client signal data according to the normal Cn value.

Referring to FIG. 9, the jump conditions among each state of the client signal receiving end are described below in detail.

In a jump condition 91, an AIS alarm is detected, that is, it is detected that all 0 or all 1 are filled in the first area and the second area of the Cbyte field.

In a jump condition 92, 1) an abnormal Cbyte field is acquired through parsing, for example, the first area CC=01, but the Cn value filled in the second area is an abnormal Cn value, that is, the Cn value exceeds the range between the Cn minimum value and the Cn maximum value of the detected client signal; 2) it is detected that an increment or decrement of the Cn value filled in the second area is not one unit value (in this embodiment, the unit value is 1), and if the manner of continuously determining N frames is adopted, 8≦N≦10.

In a jump condition 93, an AIS alarm is detected.

In a jump condition 94, 1) it is detected that CC=10, which indicates that a new client signal occurs; 2) it is detected that CC=01, which indicates that the client signal is normal, and the Cn filled in the second area of the Cbyte field is a normal Cn value, that is, the Cn falls in the range between the Cn minimum value and the Cn maximum value of the detected client signal.

In a jump condition 95, 1) an abnormal Cbyte field is acquired through parsing, for example, the first area CC=01, but the Cn value filled in the second area is an abnormal Cn value, that is, the Cn value exceeds the range between the Cn minimum value and the Cn maximum value of the detected client signal; 2) it is detected that an increment or decrement of the Cn value filled in the second area is not one unit value, and if the manner for continuously determining N frames is adopted, 8≦N≦10; 3) it is detected that CC=10 after continuously detecting the plurality of frames, which indicates that a new client signal occurs.

In a jump condition 96, it is detected that CC=01, which indicates that the client signal is normal, and the Cn filled in the second area of the Cbyte field is a normal Cn value.

In a jump condition 97, it is detected that a single CC=10, which indicates that a new client signal occurs.

In a jump condition 98, it is detected that CC=01, which indicates that the client signal is normal, and the Cn filled in the second area of the Cbyte field is a normal Cn value.

In a jump condition 99, it is detected the normal Cn value is increased and decreased by 1, that is, it is detected that most of the I bit positions or D bit positions of the Cbyte are reversed, and the Cn value is adjusted by one unit value in the next OTN frame.

The client signal receiving end may also adopt the 3-frame filtering mode, thereby improving the reliability for transporting the client signal byte number. Particularly, it is adjusted only when the Cn values in the areas of the Cbyte field are detected to be consistent in 3 continuous frames; otherwise, any change made to the current Cn is omitted. When a certain jump condition is satisfied to adjust from a certain state machine to another state machine, the new state machine may be adjusted once again after the Cn lasts for at least 3 frames. Similarly, the frame number adopted by the client signal receiving end for filtering is not limited in the present disclosure.

On the basis of the embodiment of the method for parsing the Cbyte field by the client signal receiving end, the present disclosure provides a method for receiving a client signal in the OTN, which includes the following steps.

In Step B1, the OPUk of the OTN frame is parsed to acquire the Cbyte field, the identifier in the first area of the Cbyte field is acquired, and the client signal byte number filled in the second area of the Cbyte field is acquired.

In Step B2, corresponding process is executed according to the jump condition of the state machine at the client signal receiving end.

Particularly, if the first area CC=10, it indicates that the client signal byte number born by the OPUk of the OTN frame exceeds the range between the Cn minimum value and the Cn maximum value of the detected client signal, or the first area CC=01, and the client signal byte number Cn filled in the second area falls in the range between the Cn minimum value and the Cn maximum value of the detected client signal, the client signal byte number filled in the second area is stored.

If the values of the first series of bit positions (the I bit positions) in the second area are reversed relative to the previous OTN frame, the client signal byte number filled in the second area of the previous OTN frame is stored. If it is determined that the Cn filled in the second area of the next OTN frame is increased by one unit value (in this embodiment, the unit value is 1) as compared with the Cn value filled in the second area of the previous OTN frame, the client signal byte number filled in the second area of the frame is stored in the next OTN frame.

If the values of the second series of bit positions (the D bit positions) in the second area are reversed relative to the previous OTN frame, the client signal byte number filled in the second area of the previous OTN frame is stored. If it is determined that the Cn filled in the second area of the next OTN frame is decreased by one unit value as compared with the Cn value filled in the second area of the previous OTN frame, the client signal byte number filled in the second area of the frame is stored in the next OTN frame.

If the jump condition of the LOCn state machine is satisfied, particularly, if the first area CC=01, and the Cn value filled in the second area is an abnormal Cn value, or if the first area CC=10 in the Cbyte field of a preset number of continuous OTN frames, or if it is detected that an increment or decrement of the Cn value filled in the second area is not one unit value, the latestly saved client signal byte number that does not exceed the range of the byte number is acquired and stored.

In Step B3, according to the stored client signal byte number, data of the OPUk payload area is restored in the frame next to the current frame according to the $\Sigma$-$\Delta$ algorithm, so as to acquire a client signal data stream of the Cn value stored in the previous frame.

In Step B2 of the above method, if the first area CC=10, which indicates that the Cn born by the OPUk of the OTN frame exceeds the range between the Cn minimum value and the Cn maximum value of the detected client signal, the Cn filled in the second area is further compared with the range of the Cn of the detected client signal, so as to verify whether the Cn value practically filled in the second area is consistent with the situation identified by the CC or not, and if yes, the client signal byte number filled in the second area is stored.

Those of ordinary skill in the art should understand that, all or a part of the steps in the method of the embodiment may be realized by relevant hardware instructed by a program, and the program may be stored in a computer readable storage medium. When the program is executed, the following steps are performed. The OPUk of the OTN frame is parsed to acquire the Cbyte field. The identifier in the first area of the Cbyte field is acquired, and the client signal byte number Cn filled in the second area of the Cbyte field is acquired. If the identifier indicates that the Cn exceeds the range of the Cn of the acquired client signal transported in one OTN frame period, the Cn filled in the second area is stored. Otherwise, it is compared whether the Cn filled in the second area exceeds the range of the Cn of the acquired client signal transported in one OTN frame period or not, and if not, the Cn filled in the second area is stored. According to the stored client signal byte number, the data of the OPUk payload area of the next OTN frame is restored to acquire the client signal data stream. The storage medium may be a read only memory, a magnetic disk, or an optical disk.

A structure of an apparatus for transmitting a client signal in an OTN according to an embodiment of the present disclosure is described below in detail.

Referring to FIG. 7, the apparatus for transmitting the client signal in the OTN includes a client signal unit 71, a system clock unit 73, a client signal byte number generating unit 74, a FIFO buffer unit 72, and a transmitting unit 75.

The client signal unit 71 is configured to acquire a client signal, and write the client signal into the FIFO buffer unit according to a client signal clock rate.

The system clock unit 73 is configured to provide a system clock rate.

The client signal byte number generating unit 74 is configured to generate a client signal byte number and write the client signal byte number into a Cbyte field of an OPUk of a OTN frame.

The FIFO buffer unit 72 is configured to accept a control of a reading control signal generated by the Cn generating unit in the OTN frame, and write the client signal in the FIFO buffer unit into an OPUk payload area of a next OTN frame according to the system clock rate.

The transmitting unit 75 is configured to transmit the OPUk to the OTN network.

The client signal byte number Cn generating unit 74 further includes a first computing module 101, a data module 104, a first area filling module 102, a second area filling module 103, and a reading control module 105. The operating principle of each module is described in detail as follows.

The first computing module 101 is configured to compute a client signal byte number Cn according to a client signal clock and a system clock.

The data module 104 is configured to acquire and save a range of the Cn of the acquired client signal transported in one OTN frame period.

The first area filling module 102 is configured to determine whether the computed Cn exceeds the range of the Cn of the acquired client signal transported in one OTN frame period saved by the data module or not, and identify a determination result in a first area of the Cbyte field.

The second area filling module 103 is configured to fill a second area of the Cbyte field. If the first area filling module 102 determines that the computed Cn exceeds the range of the Cn, the second area filling module 103 fills the Cn in the second area of the OTN frame. If the first area filling module 102 determines that the computed Cn falls in the range of the Cn, the second area filling module 103 fills the client signal byte number filled in the previous OTN frame into the second area of the OTN frame.

The reading control module 105 is configured to generate a reading control signal according to the Cn filled by the second area filling module 103, and transmit the reading control signal to the FIFO buffer unit 72.

The Cn generating unit 74 further includes a monitoring module 106.

The monitoring module 106 is configured to acquire a first threshold indication signal or a second threshold indication signal of the FIFO buffer unit 72, and notify the second area filling module 103.

Furthermore, the second area filling module 103 fills the second area in the following manner.

If the monitoring module 106 receives the first threshold indication signal, values of first series of bit positions in the second area of the Cbyte field are reversed in the OTN frame, and the Cn filled before the values of the bit positions in the second area are reversed is increased by one unit value.

If the monitoring module 106 receives the second threshold indication signal, values of second series of bit positions in the second area of the Cbyte field are reversed in the OTN frame, and the Cn filled before the values of the bit positions in the second area are reversed is decreased by one unit value.

The FIFO buffer unit 72 is further configured to transmit the first threshold indication signal to the monitoring unit 106, if the buffered client signal data is not lower than an upper threshold value of the FIFO buffer unit 72, and transmit the second threshold indication signal to the monitoring module 106, if the buffered client signal data is not higher than a lower threshold value of the FIFO buffer unit 72.

If an abnormal alarm occurs to the acquired client signal, the first area filling module 102 and the second area filling module 103 fill all 1 or all 0 in the first area and the second area of the Cbyte field of the OPUk.

A structure of an apparatus for receiving a client signal in an OTN according to the present disclosure is described in detail as follows. The apparatus includes a receiving unit 111, a first parsing unit 112, a second parsing unit 113, a first determining unit 114, a second determining unit 115, a storing unit 116, and a client signal recovering unit 117. The operating principle of the apparatus for receiving the client signal is described in detail.

The receiving unit 111 is configured to acquire an OPUk from the OTN.

The first parsing unit 112 is configured to parse the OPUk to acquire an identifier in a first area of a Cbyte field of the OPUk of the OTN frame.

The second parsing unit 113 is configured to parse the OPUk to acquire a client signal byte number Cn filled in a second area of the Cbyte field of the OPUk of the OTN frame.

The first determining unit 114 is configured to trigger the storing unit 116 to store the client signal byte number acquired through parsing by the second parsing unit 113, if the identifier indicates that the client signal byte number of the OTN frame exceeds a range between a Cn minimum value and a Cn maximum value of the detected client signal; otherwise, compare whether the Cn acquired through parsing by the second parsing unit 113 exceeds the range of the Cn (including the Cn maximum value and the Cn minimum value) of the acquired client signal transported in one OTN frame period or not, and if yes, trigger the storing unit 116 to store the Cn acquired through parsing by the second parsing unit 113.

The first determining unit 114 triggers the storing unit 116 to store the client signal byte number saved by the previous OTN frame, if it is determined that the identifier indicates that the Cn of the OTN frame does not exceed the range of the Cn, and the Cn filled in the second area exceeds the range of the Cn.

If the identifier indicates that the Cn exceeds the range of the Cn in a preset number of continuous OTN frames, the first determining unit 114 triggers the storing unit 116 to store the Cn latestly acquired through parsing by the second parsing unit 113 that does not exceed the range of the Cn.

The first determining unit 114 executes an alarming process, if the first parsing unit 112 and the second parsing unit 113 parse and acquire that all 0 or all 1 are filled in the first area and the second area of the Cbyte field.

The second determining unit 115 is configured to trigger the storing unit 116 to store the Cn filled in the second area of the previous OTN frame, if it is determined that values of first series of bit positions in the second area are reversed relative to values of first series of bit positions of the previous OTN frame, and is configured to trigger the storing unit 116 to store the Cn filled in the second area of the frame into the next OTN frame, if it is determined that the Cn filled in the second area of the next OTN frame is increased by one unit value as compared with the Cn filled in the second area of the previous OTN frame.

The second determining unit 115 is configured to trigger the storing unit 116 to store the Cn filled in the second area of the previous OTN frame, if it is determined that values of second series of bit positions in the second area are reversed relative to values of second series of bit positions of the previous OTN frame, and is configured to trigger the storing unit to store the Cn filled in the second area of the frame into the next OTN frame, if it is determined that the Cn filled in the second area of the next OTN frame is decreased by one unit value as compared with the Cn filled in the second area of the previous OTN frame.

The second determining unit 115 triggers the storing unit 116 to store the Cn saved in the previous OTN frame, if it is determined that an increment or decrement of the Cn filled in the second area of the next OTN frame is not one unit value as compared with the Cn filled in the second area of the previous OTN frame.

The storing unit 116 is configured to maintain the client signal byte number Cn, and particularly, the storing unit 116 stores the Cn acquired through parsing by the second parsing unit 113, upon being triggered by the first determining unit 114.

The client signal recovering unit 117 is configured to restore data of an OPUk payload area of the next OTN frame according to the client signal byte number maintained by the storing unit 116, so as to acquire a client signal data stream.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A method for transmitting a client signal in an optical transport network (OTN), comprising:
    acquiring the client signal;
    extracting a client signal clock from the client signal;
    generating a client signal byte number Cn transported in an OTN frame period according to a client signal clock and a system clock;
    if the Cn transported in the OTN frame needs to be increased, reversing, values of a first series of bit positions of a second area in an optical channel payload unit-k (OPUk) of the OTN frame, and filling values of a second series of bit positions of the second area in the OPUk with a Cn filled in a previous OTN frame;
    if the Cn transported in the OTN frame needs to be decreased, reversing, values of the second series of bit positions of the second area in the OPUk overhead field of the OTN frame, and filling values of the first series of bit positions of the second area in the OPUk with the Cn filled in the previous OTN frame.

2. The method according to claim 1, further comprising:
    determining whether the client signal byte number Cn exceeds a range of client signal byte number transported in an OTN frame period;
    if the Cn of the OTN frame exceeds the range, identifying, a new client signal in a first area in the OPUk overhead field of the OTN frame, and filling the Cn in the second area of the OTN frame.

3. The method according to claim 1, further comprising:
    determining whether the client signal byte number Cn exceeds a range of client signal byte number transported in an OTN frame period;
    if the Cn of the OTN frame falls in the range, and the Cn transported in the OTN frame doesn't need to be increased or decreased, identifying the Cn is normal in a first area in an optical channel payload unit-k (OPUk) overhead field of the OTN frame, and filling a second area in the OPUk overhead field of the OTN frame with a Cn filled in a previous OTN frame.

4. A method for receiving a client signal in an optical transport network (OTN), comprising:
    parsing an optical channel payload unit-k (OPUk) of an OTN frame to acquire a second area in an OPUk overhead field;
    if it is determined that values of a first series of bit positions in the second area of the OTN frame are reversed relative to values of the first series of bit positions of the previous OTN frame, according to a increased Cn value, restoring data of the OPUk payload area of a next OTN frame to acquire a client signal data stream; and
    if it is determined that values of a second series of bit positions in the second area of the OTN frame are reversed relative to values of the second series of bit positions of the previous OTN frame, according to a decreased Cn value, restoring data of the OPUk payload area of the next OTN frame to acquire the client signal data stream.

5. The method according to claim 4, further comprising:
    parsing the optical channel payload unit-k (OPUk) of the OTN frame to acquire a first area in the OPUk overhead field;
    acquiring an identifier in the first area; and
    if the identifier indicates that the Cn of the OTN frame exceeds the range, according to the Cn in the second area of the OTN frame, restoring data of the OPUk payload area of the next OTN frame to acquire the client signal data stream.

6. The method according to claim 4, further comprising:
    parsing the optical channel payload unit-k (OPUk) of the OTN frame to acquire a first area in the OPUk overhead field;
    acquiring an identifier in the first area; and
    if the identifier indicates that the Cn of the OTN frame falls in the range, and if it is determined that values of a first series or a second series of bit positions in the second area of the OTN frame aren't reversed relative to values of the first series of bit positions of the previous OTN frame, according to the Cn in the second area of the OTN frame, restoring data of the OPUk payload area of the next OTN frame to acquire the client signal data stream.

7. An apparatus for transmitting a client signal in an optical transport network (OTN), comprising:
    an acquiring unit configured to acquire the client signal, and extract a client signal clock from the client signal;
    a client signal byte number Cn generating unit configured to generate a client signal byte number Cn transported in an OTN frame period according to the client signal clock and a system clock;
    a first processing unit configured to reverse, if the Cn transported in the OTN frame needs to be increased, values of a first series of bit positions of a second area in an optical channel payload unit-k (OPUk) of the OTN frame, and fill values of a second series of bit positions of the second area in the OPUk with a Cn filled in a previous OTN frame; and
    a second processing unit configured to reverse, if the Cn transported in the OTN frame needs to be decreased, values of a second series of bit positions of the second area in the OPUk overhead field of the OTN frame, and fill values of the first series of bit positions of the second area in the OPUk with the Cn filled in the previous OTN frame.

8. The transmitting apparatus according to claim 7, further comprising:

a determining unit configured to determine whether the client signal byte number Cn exceeds a range of client signal byte number transported in an OTN frame period; and if the Cn of the OTN frame exceeds the range, an identifying unit configured to identify a new client signal in a first area in the OPUk overhead field of the OTN frame, and a filling unit configured to fill the Cn in the second area of the OTN frame.

9. The transmitting apparatus according to claim 7, further comprising:

a determining unit configured to determine whether the client signal byte number Cn exceeds a range of client signal byte number transported in an OTN frame period; and if the Cn of the OTN frame falls in the range, and the Cn transported in the OTN frame doesn't need to be increased or decreased, an identifying unit configured to identify the Cn is normal in a first area in an optical channel payload unit-k (OPUk) overhead field of the OTN frame, and a filling unit configured to fill a second area in the OPUk overhead field of the OTN frame with a Cn filled in a previous OTN frame.

10. An apparatus for receiving a client signal in an optical transport network (OTN), comprising:

a parsing unit configured to parse an optical channel payload unit-k (OPUk) of an OTN frame to acquire a second area in an OPUk overhead field;

if it is determined that values of a first series of bit positions in the second area of the OTN frame are reversed relative to values of the first series of bit positions of the previous OTN frame, according to a increased Cn value, a restoring unit configured to restore data of the OPUk payload area of a next OTN frame to acquire a client signal data stream; and if it is determined that values of a second series of bit positions in the second area of the OTN frame are reversed relative to values of the second series of bit positions of the previous OTN frame, according to a decreased Cn value, a restoring unit configured to restore data of the OPUk payload area of the next OTN frame to acquire the client signal data stream.

11. The receiving apparatus according to claim 10, wherein the parsing unit further configured to parse the optical channel payload unit-k (OPUk) of the OTN frame to acquire a first area in the OPUk overhead field;

the apparatus further comprising:

an acquiring unit configured to acquire an identifier in the first area; and if the identifier indicates that the Cn of the OTN frame exceeds the range, according to the Cn in the second area of the OTN frame, the restoring unit configured to restore data of the OPUk payload area of the next OTN frame to acquire the client signal data stream.

12. The receiving apparatus according to claim 10, wherein the parsing unit further configured to parse the optical channel payload unit-k (OPUk) of the OTN frame to acquire a first area in the OPUk overhead field;

the apparatus further comprising:

an acquiring unit configured to acquire an identifier in the first area; and if the identifier indicates that the Cn of the OTN frame falls in the range, and if it is determined that values of a first series or a second series of bit positions in the second area of the OTN frame aren't reversed relative to values of the first series of bit positions of the previous OTN frame, according to the Cn in the second area of the OTN frame, the restoring unit configured to restore data of the OPUk payload area of the next OTN frame to acquire the client signal data stream.

13. A method for transmitting a client signal in an optical transport network (OTN), comprising:

saving an acquired range of a client signal byte number Cn of a client signal transported in one OTN frame period;

acquiring the client signal, and computing the Cn transported in the OTN frame period according to a client signal clock and a system clock;

identifying whether the Cn exceeds the range in a first area of a Cbyte field of an optical channel payload unit-k, OPUk, wherein the Cbyte field is divided into the first area and a second area;

in a current OTN frame, if the computed Cn exceeds the range, filling in a second area of the Cbyte field of the OPUk with the computed Cn; and if the computed Cn falls in the range, filling in the second area of the Cbyte field of the OPUk of the current OTN frame with the Cn same as that filled in the previous OTN frame; and in the frame next to the current OTN frame, mapping Cn client signal bytes to an OPUk payload area, and transmitting an optical channel transport unit, OTU, comprising the OPUk to the OTN network.

14. A computer program product comprising a non-transitory computer readable storage medium storing computer executable instructions thereon for performing a method that comprises:

saving an acquired range of a client signal byte number Cn of a client signal transported in one OTN frame period;

acquiring the client signal, and computing the Cn transported in the OTN frame period according to a client signal clock and a system clock;

identifying whether the Cn exceeds the range in a first area of a Cbyte field of an optical channel payload unit-k, OPU;

in a current OTN frame, if the computed Cn exceeds the range, filling in a second area of the Cbyte field of the OPUk with the computed Cn; and if the computed Cn falls in the range, filling in the second area of the Cbyte field of the OPUk of the current OTN frame with the Cn same as that filled in the previous OTN frame; and in the frame next to the current OTN frame, mapping Cn client signal bytes to an OPUk payload area, and transmitting an optical channel transport unit, OTU, comprising the OPUk to the OTN network.

15. An apparatus comprising: a processor configured to implement a method for transmitting a client signal in an optical transport network (OTN), comprising:

acquiring the client signal;

extracting a client signal clock from the client signal;

generating a client signal byte number Cn transported in an OTN frame period according to a client signal clock and a system clock;

if the Cn transported in the OTN frame needs to be increased, reversing, values of a first series of bit positions of a second area in an optical channel payload unit-k (OPUk) of the OTN frame, and filling values of a second series of bit positions of the second area in the OPUk with a Cn filled in a previous OTN frame; and if the Cn transported in the OTN frame needs to be decreased, reversing, values of the second series of bit positions of the second area in the OPUk overhead field of the OTN frame, and filling values of the first series of bit positions of the second area in the OPUk with the Cn filled in the previous OTN frame.

* * * * *